United States Patent [19]
Herman et al.

[11] Patent Number: 5,792,364
[45] Date of Patent: Aug. 11, 1998

[54] WASTEWATER TREATMENT PROCESS FOR VACUUM DEGASSER EFFLUENT

[75] Inventors: Stewart T. Herman, Hellertown; Robert L. Greenawalt, Ottsville, both of Pa.

[73] Assignee: Bethlehem Steel Corporation

[21] Appl. No.: 841,138

[22] Filed: Apr. 29, 1997

[51] Int. Cl.$^6$ ..................................... C02F 1/52
[52] U.S. Cl. .................. 210/710; 210/712; 210/724; 210/726; 210/778; 210/912
[58] Field of Search .................. 210/710, 712, 210/724, 726, 912, 778

[56] References Cited

U.S. PATENT DOCUMENTS

| | | | |
|---|---|---|---|
| 1,968,114 | 7/1934 | Windecker | 210/28 |
| 3,959,133 | 5/1976 | Fulton | 210/45 |
| 4,018,680 | 4/1977 | Kupfer | 210/721 |
| 4,025,430 | 5/1977 | Pagel | 210/53 |
| 4,465,597 | 8/1984 | Herman et al. | 210/713 |
| 5,080,806 | 1/1992 | Balzano | 210/730 |
| 5,178,773 | 1/1993 | Kerlin et al. | 210/724 |
| 5,266,210 | 11/1993 | McLaughlin | 210/710 |
| 5,273,661 | 12/1993 | Pickett et al. | 210/710 |
| 5,370,800 | 12/1994 | Stevenson | 210/710 |
| 5,435,835 | 7/1995 | Lynn et al. | 75/770 |

*Primary Examiner*—Peter A. Hruskoci
*Attorney, Agent, or Firm*—Harold I. Masteller, Jr.

[57] ABSTRACT

A system and method for disposing of vacuum degasser contaminants which includes adjusting the pH, in a reactor vessel, of a vacuum degasser underflow stream to precipitate lead and zinc into particulate matter. The solids are then concentrated in a thickener to produce an underflow stream that is communicated to a holding vessel to settle. The overflow from the thickener is filtered through a sand filter and discharged to meet applicable NPDES permit limits. Lime is added to the slurry in the holding vessel to further settle the solids, to aid in filtration, and to prevent leaching of lead from the filter cake during TCLP testing. An overlaying supernatant is decanted from the holding vessel and returned to the reactor vessel for further treatment. Limestone is added to the underflow stream. The resulting slurry is dewatered to produce a friable, non-hazardous filtrate cake and a filtrate. The filtrate is directed back to reactor vessel prior to discharge for further treatment.

25 Claims, 4 Drawing Sheets

WASTEWATER TREATMENT PROCESS FOR VACUUM DEGASSER EFFLUENT

FIELD OF THE INVENTION

The disclosed invention is a method and system for treating wastewaters created in an integrated steel facility. More specifically, the disclosed invention is a method and system for treating and disposing of vacuum degasser contaminants generated during the vacuum degassing of steel.

BACKGROUND OF THE INVENTION

In the steel industry, molten steel produced in a basic oxygen furnace or electric arc furnace may contain certain undesirable gases. In order to remove these gases, vacuum degassing ("VDG") of the steel is sometimes used. Vacuum degassing is accomplished by placing the molten steel in an air tight chamber, and subjecting the steel to a vacuum while stirring it. Steam ejectors may be used to create a vacuum over the molten steel, with the vacuum causing undesirable gasses to be removed from the steel. Other high vapor pressure materials are also removed from the steel during the vacuum degassing operation. Two of these high vapor pressure materials are lead and zinc.

The steam used to produce the vacuum is frequently condensed with water sprays emanating from spray nozzles. Vaporized zinc, lead, and other metals condense to form fine particulate matter. These solid precipitates are captured in the resulting condensed water stream. The water is normally recirculated and used to quench the steam from the ejectors. A side stream of the recirculated water is frequently treated to remove solids. If not treated, the solids concentration may increase sufficiently to plug the steam condenser spray nozzles.

In addition, the excess water produced from quenching the steam must be discharged to prevent the recirculated water circuit from overflowing. The presence of zinc and lead in the water raises environmental concerns. The discharge criteria for zinc and lead contained in the wastewater are very stringent. The Environmental Protection Agency ("EPA") permits only a specified amount of zinc and lead mass discharge, regardless of the concentration of zinc and lead in the wastewater. The concentration of zinc and lead in the wastewater must frequently be reduced to very low levels to achieve the low mass discharge rates. Wastewater that is diluted to decrease the concentration of zinc and lead and discharged at a higher rate may still exceed permissible effluent mass discharge limits. Thus, zinc and lead in excess of acceptable discharge criteria must be removed from the wastewater. Further, it is desirable to dispose of the zinc and lead in non-hazardous waste landfills in order to minimize disposal costs.

In order to dispose of the zinc and lead solids in a landfill, the solids must be dewatered prior to disposal. Vacuum degasser ("VDG") wastewater does not produce a settled slurry with a high solids concentration. Because of the low concentration of solids in the VDG wastewaters, it is very difficult to dewater the settled slurry containing the zinc and lead particulates.

In addition, depending upon the amount of lead present in the solids, the filter cake produced by the dewatering process may fail the toxic characteristic leaching procedure ("TCLP") test and may be classified as a hazardous waste. If the filter cake fails the TCLP test, it is deemed hazardous, and must be disposed of in an approved hazardous waste landfill. The cost for such disposal far exceeds the cost for disposal of non-hazardous material, and is expected to increase with time.

Thus, there is a need in the art for disposing of vacuum degasser contaminants to produce an easily dewaterable filter cake that passes the TCLP test and an effluent that meets applicable EPA discharge criteria.

SUMMARY OF THE INVENTION

A principal object of the present invention is to provide a method and system for disposing of vacuum degasser contaminants to produce an easily dewaterable filter cake that passes the TCLP test and an effluent that meets applicable EPA discharge criteria. This above object is achieved according to the present invention.

A method of disposing of vacuum degasser ("VDG") contaminants according to the invention includes adjusting the pH of a vacuum degasser underflow stream to a level sufficient to precipitate lead and zinc. Suspended solids are concentrated in the underflow stream. The concentrated solids of the underflow stream are communicated to a holding vessel. Lime is added to the underflow stream in the holding vessel. The underflow stream is allowed to settle. Supernatant is removed from the underflow stream in the holding vessel. Limestone is added to the underflow stream. The underflow stream is dewatered.

A method of disposing of vacuum degasser contaminants includes the step of adjusting in a reactor vessel the pH of a vacuum degasser underflow stream to a level sufficient to precipitate lead and zinc. The underflow stream of the reactor vessel is communicated to a thickener in which the suspended solids in the underflow stream are concentrated. The overflow from the thickener is removed. The underflow stream of the thickener vessel is communicated to a holding vessel. Lime is added to the underflow stream in the holding vessel, and the underflow stream is allowed to settle. Supernatant is removed from the holding vessel, and communicated to a reactor vessel. Limestone is added to the underflow stream in the holding vessel. The underflow stream in the holding vessel is dewatered.

A method for disposing of vacuum degasser contaminants includes the step of adjusting the pH of a vacuum degasser underflow stream to a level of sufficient to precipitate lead and zinc. Suspended solids are concentrated in the underflow stream. The concentrated solids are communicated to a holding vessel. Lime and limestone are added to the underflow stream in the holding vessel, and the underflow stream is then allowed to settle. Supernatant is removed from the underflow stream in the holding vessel, and the underflow stream is dewatered.

A system for disposing of vacuum degasser contaminants includes a reactor vessel for receiving a vacuum degasser underflow stream. A pH controller is operably associated with the reactor vessel for adjusting the pH of the underflow stream to a level sufficient to precipitate lead and zinc. A thickener receives the underflow stream from the reactor vessel, and concentrates the suspended solids in the underflow stream. A holding vessel receives the underflow stream from the thickener, and includes an agitator which mixes the underflow stream with lime and limestone. A decant tank removes supernatant from the underflow stream. A filter press dewaters the underflow stream.

These and other objects and advantages of the invention will be readily apparent in view of the following description and drawings of the above-identified invention.

BRIEF DESCRIPTION OF THE DRAWINGS

The above and other objects and advantages and novel features will become apparent from the detailed description of the preferred embodiment of the invention illustrated in the accompanying drawings, wherein.

DETAILED DESCRIPTION OF THE PREFERRED EMBODIMENT

The present invention is directed to the removal and disposal of contaminants from wastewater, particularly wastewater generated in an integrated steel facility. The term "wastewater" refers to water containing undesirable amounts of contaminants. Two of these contaminants are lead and zinc. The present invention provides a method and system for removing these undesirable contaminants from the wastewater, so that discharge criteria mandated by the Federal Environmental Protection Agency are achieved. Further, the solid contaminants removed from the wastewater are treated to be both landfillable and non-hazardous.

Figure 1:
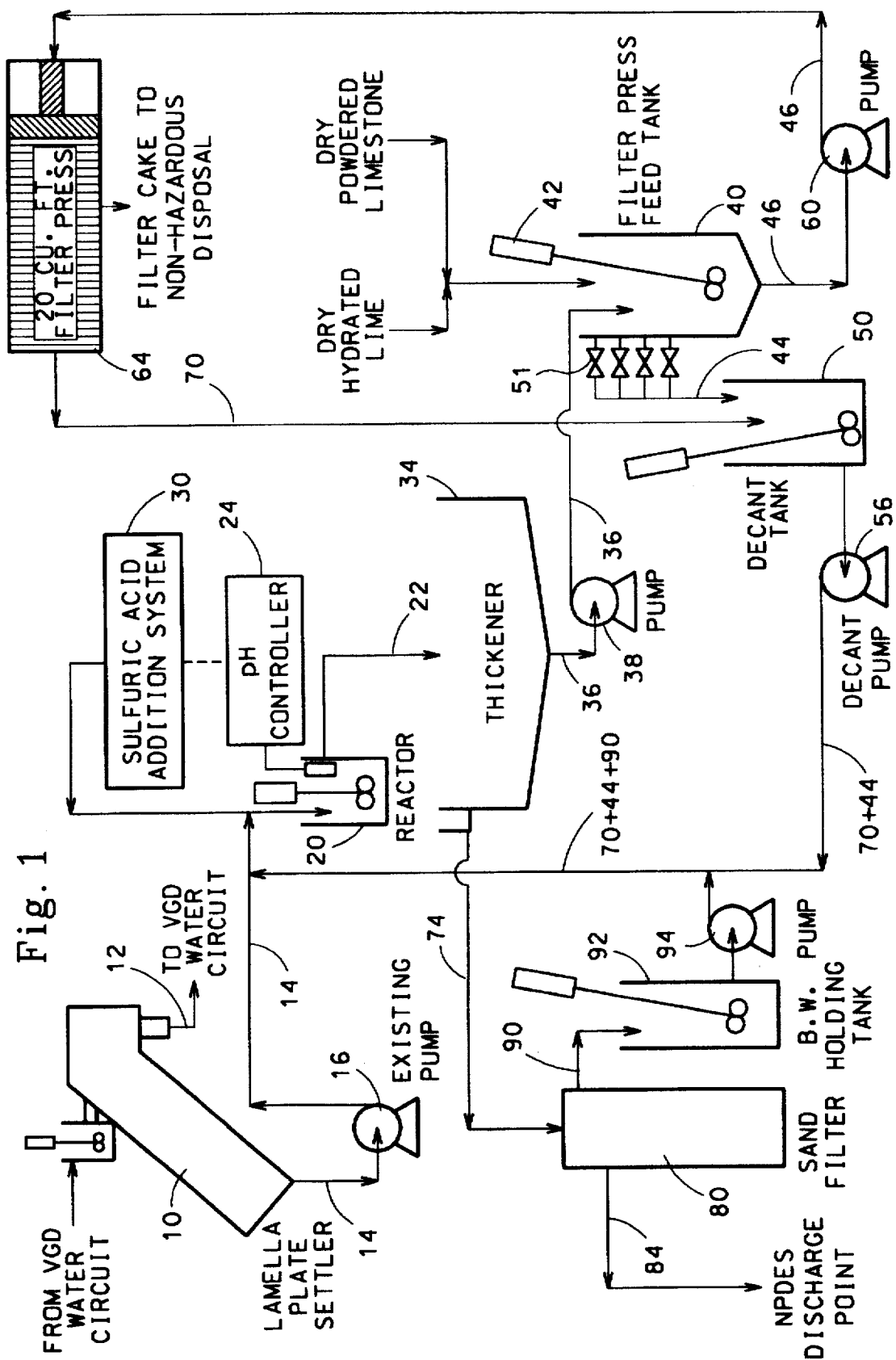
FIG. 1 is a schematic diagram of the system of the invention.

FIG. 1 illustrates the preferred embodiment of the present invention. Wastewater from a vacuum degasser (VDG) water circuit is communicated to a Lamella plate-settler 10. Before entering plate-settler 10, the wastewater stream may be treated with a suitable polymer to coagulate fine suspended solids. Once the fine solids are coagulated, then they are removed in the Lamella plate-settler 10. The clarified water is returned at 12 to the vacuum degasser water circuit, and the water is reused in the vacuum degassing process. The underflow 14 of the Lamella plate-settler 10, containing the coagulated solids (or VDG solids), must be further treated prior to discharge to produce an acceptable non-hazardous solid discharge, as well as a clarified water stream which meets the NPDES permit discharge loading for zinc and lead. The NPDES permit mass discharge limits for zinc and lead at the facility where the invention was developed were 0.20 lbs/day and 0.14 lbs/day, respectively.

Thus, the plate-settler stream 14 of VDG slurry is directed through pump 16 into neutralization reactor 20. As used herein, slurry means a suspension of a solid in a liquid. Wastewater streams 70, 44, and 90 from the VDG underflow treatment process mix with plate settler underflow stream 14 in neutralization reactor 20 to form wastewater stream 22. At this point, the mixed wastewater stream 22 exiting neutralization reactor 20 contains a low, unsettled solids concentration, and zinc and lead concentrations in excess of the NPDES permit mass discharge limits. In order for the mixed wastewater stream 22 to meet the NPDES discharge limits, the pH of the VDG slurry is first adjusted to a level sufficient to precipitate any soluble zinc and lead. In the preferred embodiment, the pH is preferably maintained at between 8.0 and 9.0 to stay within the NPDES permit discharge limits for pH. This is within the range of 8.0 and 9.5, as disclosed in U.S. Pat. No. 5,435,835, the disclosure of which is incorporated herein by reference and the assignee of which is the assignee hereof. This pH level permits zinc and lead to precipitate, and results in environmentally acceptable soluble zinc and lead concentrations.

The pH of neutralization reactor 20 is controlled by pH controller 24. The pH controller 24 modulates sulfuric acid addition system 30, which adds sulfuric acid to neutralization reactor 20 to maintain the pH of the mixed wastewater stream 22 in neutralization reactor 20 between 8.0 and 9.0. When filtrate stream 70 or decant stream 44 is added to the neutralization reactor 20, concentrated sulfuric acid should be added to neutralization reactor 20 in an amount of about 3.0 ml per gallon of mixed wastewater stream 22 to maintain the preferred pH level. Those skilled in the art will appreciate that the acid addition will be dependent upon the particular installations and that acids other than sulfuric acid may be used.

In the preferred embodiment, neutralization reactor 20 is a 1,750 gallon tank which receives underflow stream 14 from plate-settler 10 at a rate of 75 gpm, with the underflow stream 14 having a total suspended solids concentration of between 150 and 3,000 ppm. Neutralization reactor 20 also receives wastewater streams 70, 44, and 90. The solids concentration of the mixed wastewater stream 22 is too low to be filtered efficiently in a plate and frame filter or a belt press. Thus, after exiting neutralization reactor 20, the mixed wastewater stream 22 proceeds to thickener 34 in which the solids are concentrated. The thickener may be a "high-capacity" thickener, which is installed completely above ground on structural steel legs. Both Eimco and Enviro-Tech manufacture high-capacity thickeners.

Figure 2:
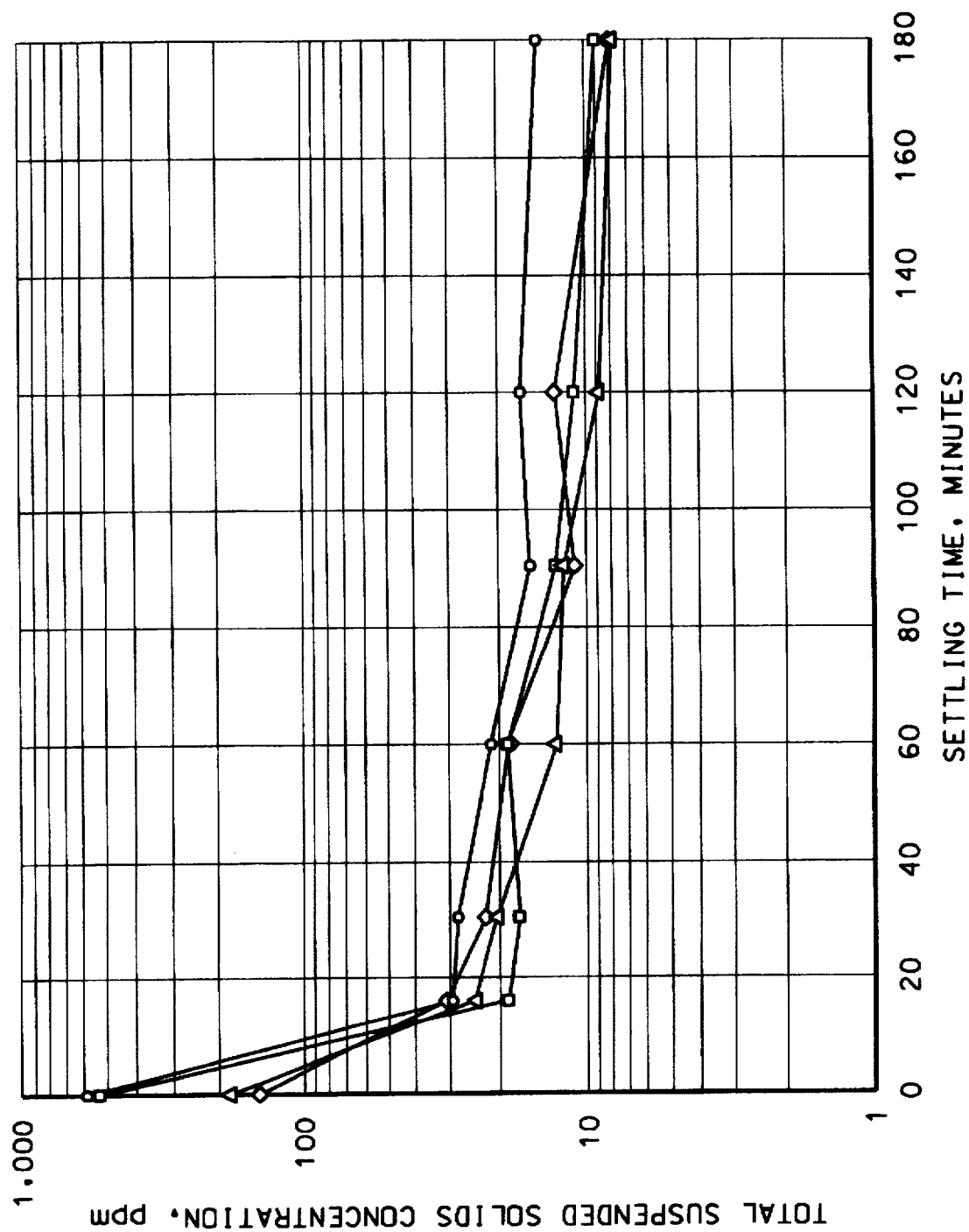
FIG. 2 is a graph of total suspended solids concentration versus settling time.

Once the mixed wastewater stream 22 is received in thickener 34, then the solids are permitted to settle over a predetermined period. As best shown in FIG. 2, a static settling time of 180 minutes produces an effluent containing 10–15 ppm of total suspended solids, 0.6 to 1.0 ppm of total zinc, and 0.1 to 0.3 ppm of total lead. In order to account for the difference between static and dynamic conditions, an areal efficiency factor of between 2.5 and 3 must be applied to the data from FIG. 2 to design a full scale, (continuous flow, settling device. Thus, a settling time of between 7.5 and 9.0 hours will be required to produce the effluent quality seen in FIG. 2 at 3.0 hours (180 minutes). Depending upon the type of thickener used, the optimum settling times may vary. In the preferred embodiment, thickener 34 has a diameter of 30 feet.

The size of the thickener 34 is determined by taking into account the required detention time, as well as the flow rate of mixed wastewater stream 22 into thickener 34.

Thickener underflow stream 36 proceeds from thickener 34 to holding vessel 40 in response to pump 38. After exiting thickener 34, thickener underflow stream 36 contains between 1 to 5 percent by weight of solids. In order to dispose of the solids, they must be dewatered prior to landfill disposal. In addition, the filter cake must contain no free water in order to pass the paint filter test. The settled VDG solids will not produce an acceptable filter cake without combining the VDG solids with an additive. Therefore, lime ($Ca(OH)_2$) is added to the thickener underflow stream 36 in holding vessel 40 after the solids are thickened to aid in filtration of thickener underflow stream 36.

Figure 4:
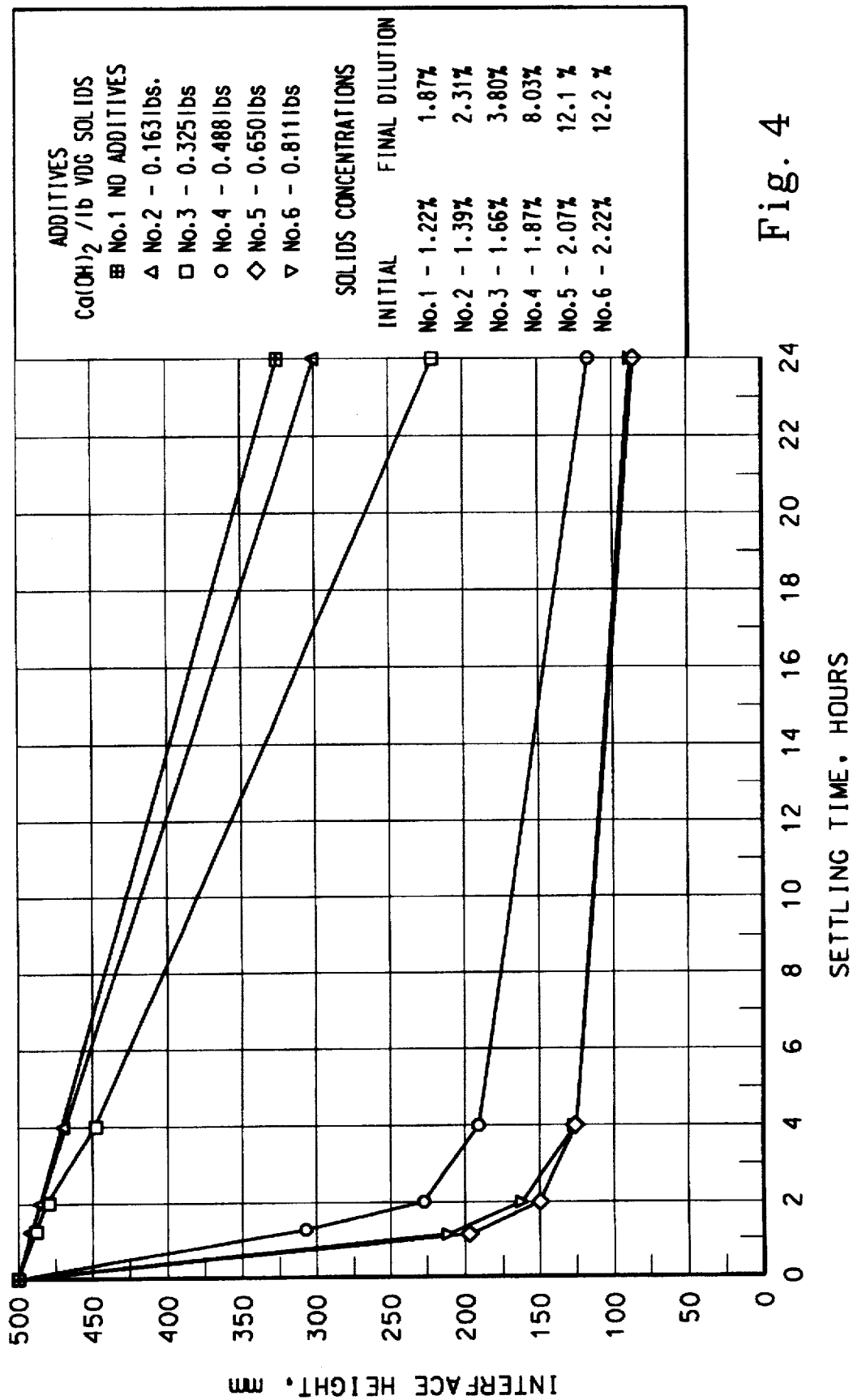
FIG. 4 is a graph of solids concentrations after various lime addition and settling times.

The addition of lime to thickener to underflow stream 36 produces considerable further settling of VDG solids. The VDG solids contain extremely high surface charges that cause the particles to repel one another, which impedes solids concentration. Lime neutralizes those charges and allows additional solids settling. With reference in particular to FIG. 4, the most to rapid settling and highest ultimate solids concentrations were obtained at lime additions above 0.488 lbs $Ca(OH)_2$/lb VDG solids. Addition above 0.65 lbs $Ca(OH)_2$/lb of VDG solid did not materially improve the settling rate of the final solids concentration. The addition of lime allows the solids to settle to a much higher concentration than otherwise could be achieved. This greatly reduces the volume of slurry to be filtered, and markedly shortens the filtration time.

Figure 3:
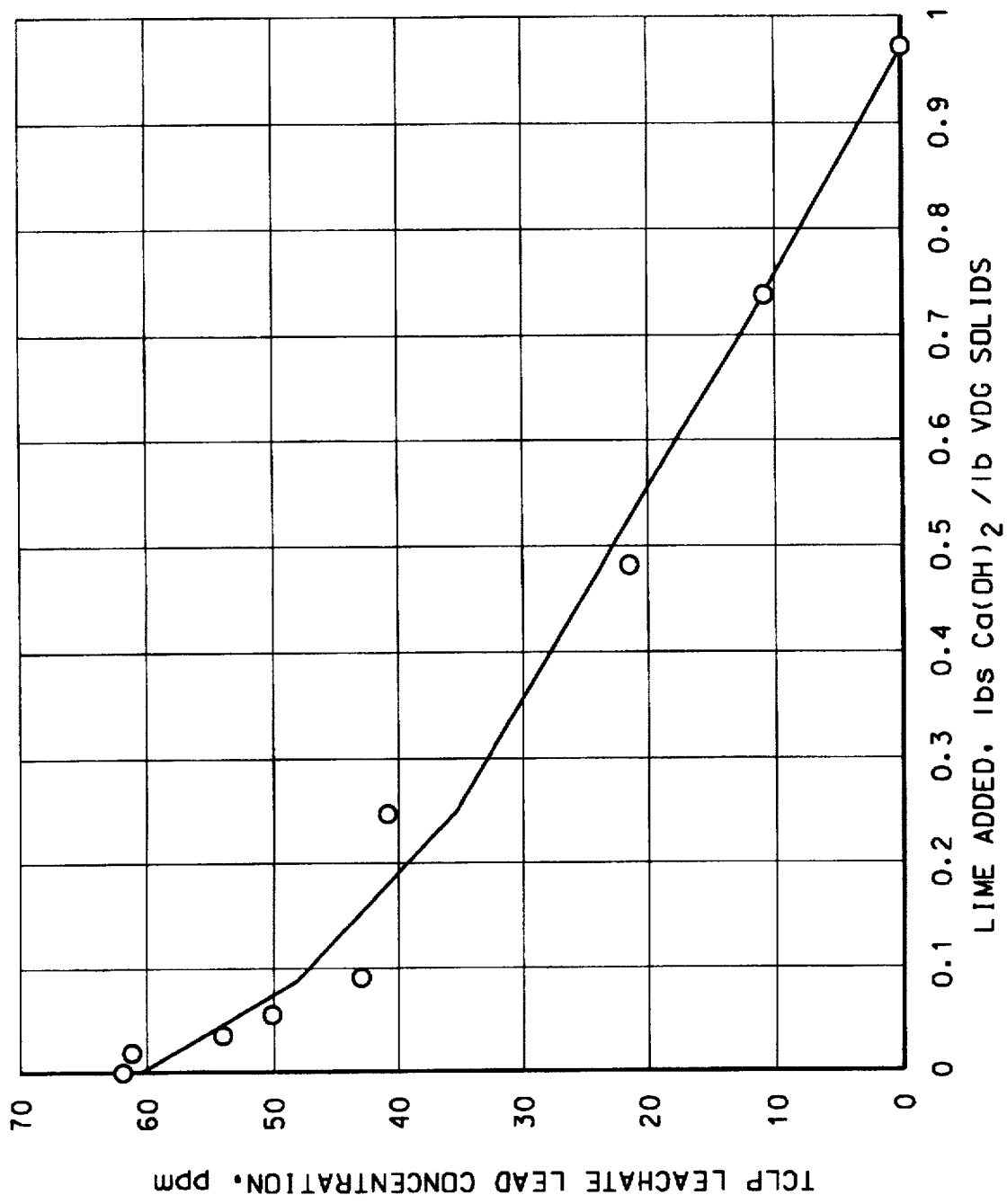
FIG. 3 is a graph of TCLP leachate lead concentration of the wastewater versus lime addition.

Lime addition serves another function, aside from aiding in filtration. It is added to prevent leaching of lead from the filter cake. Lead concentration in the leachate must be below 5.0 ppm to pass the TCLP test. Lime addition to the vacuum degasser solids prevents leaching of metal hydroxides by acid rain, which is what the TCLP test simulates. FIG. 3 illustrates that at least 0.87 lbs of $Ca(OH)_2$/lb of VDG solids is sufficient to prevent the VDG slurry from failing the TCLP tests for lead. Lime addition of 0.97 lbs of $Ca(OH)_2$/lb of VDG solids assures that TCLP limits are met. Thus, a concentration of 0.65 lbs of $Ca(OH)_2$/lb of VDG solids is needed for settling, while 0.97 lbs of $Ca(OH)_2$/lb of VDG solids is needed for the prevention of lead resolublization during TCLP testing. However, other materials less expensive than lime can be used to prevent lead resolubilization. While 0.65 lbs of lime is still needed to settle the solids, the difference between 0.97 and 0.65 lbs of lime (0.32 lbs) of an appropriate alternative material can replace lime addition in this range. In the preferred embodiment, limestone ($CaCO_3$) is the alternative material.

Limestone is added to the thickener underflow stream 36 in holding vessel 40 after lime is added, to further enhance filtration as well as to reduce leaching. However, limestone addition has no effect on the settling rate. Limestone is used to make up the difference in alkalinity between the lime needed for settling and the lime needed for the prevention of lead resolubilization. The limestone, while not nearly as strong a base as hydrated lime, can be used to replace some of the lime needed to prevent lead resolubilization. Lime has a molecular weight of 74 lbs/lb mole. Limestone has a molecular weight of 100 lbs/lb mole. In order to replace 1.0 lb of alkalinity provided by the lime, 1.35 lbs of limestone must be added. The difference between 0.97 and 0.65 lbs of lime is 0.32 lbs. At 1.35 lbs of limestone per lb of lime, 0.43 lbs of limestone would have to be added to replace the lime. Any amount of lime between the 0.65 and 0.97 lb figures can be replaced by the limestone. The cost of limestone is far less expensive than lime, decreasing the entire cost of the treatment. Thus, the addition of lime and limestone to the VDG slurry produces a filter cake that passes the TCLP test (lead concentration of less than 5.0 ppm in the leachate) and allows the filter cake to be disposed of as a non-hazardous waste.

Referring to FIG. 1, hydrated lime is added to holding vessel 40. In the preferred embodiment, holding vessel 40 is a 6,000 gallon filter press feed tank equipped with an agitator 42. It is preferred that the lime be mixed for a few minutes with agitator 42. Agitator 42 is then stopped, and the lime-treated underflow is allowed to :settle. In the preferred embodiment, the settling occurs overnight. The solids settle at the bottom of holding vessel 40, while a supernatant overlies the solids. The supernatant is very turbid, and does not clarify even with extended settling times. Therefore, the cloudy supernatant 44 is decanted through a series of valves 51 into a 4,000 gallon decant tank 50. The lime raises the pH of the supernatant to over 11.0 and resolubilizes a very small portion of the zinc and lead in the VDG solids. Supernatant 44 contains concentrations of both suspended and soluble zinc and lead in excess of the NPDES permit criteria. Thus, before the supernatant is discharged, it must neutralized to precipitate the lead and zinc and clarified to remove the suspended zinc and lead hydroxides. Therefore, supernatant 44 is communicated to pump 56 which recirculates supernatant 44 to neutralization reactor 20, where it mixes with plate settler underflow stream 14 to form mixed wastewater stream 22. Any soluble zinc and lead contained in supernatant 44 is precipitated in neutralization reactor 20. The insoluable zinc and lead hydroxides are removed from supernatant 44 in thickener 34.

After supernatant 44 is removed from holding vessel 40, agitator 42 of holding vessel 40 is energized and limestone is added. Both lime and limestone can be added in bag lots by use of bag-breaks. This eliminates the need for bin storage and feeders. The lime and limestone treated slurry contained in holding vessel 40 is pumped by filter press feed pump 60 to a twenty cubic foot filter press 64 for dewatering at a maximum pressure of 200 psig. Pressures above this level could damage the press, while providing no extra water removal.

There are two types of filter presses that can produce the high pressures that are necessary to dewater the VDG slurry. The first utilizes a pump to produce the pressure directly. The second uses a lower pressure feed pump to fill the press and begin the cake compression. Bladders on either side of the filter cake are then pump)ed full of high pressure fluid to further squeeze the cake. The first type of press is recommended. The "bladder" presses are more complicated to operate, and require two pumping systems. The bladders are also subject to wear and replacement. Nevertheless, using either press, the resulting filter cake is friable, and may be disposed of as solid waste in a non-hazardous landfill.

The filtrate 70 from the filter press 64 contains amounts of soluble zinc and lead above the NPDES permit limits, due to the high pH from the lime addition. Therefore, filtrate 70 is directed to decant tank 50, so that both supernatant 44 and filtrate 70 are ultimately directed to neutralization reactor 20. Also, if any solids escape the filter press 64 due to a failure of a filter cloth, they are removed in thickener 34. The pH of the wastewaters directed to neutralization reactor 20 is monitored and maintained between 8.0 and 9.0.

In addition, overflow 74 from thickener 34 must be filtered prior to discharge, so that total zinc and lead mass discharge rates may be reduced to NPDES permit limits. Overflow 74 from thickener 34 enters an ultra-high rate filter filled with high silica content, size graded sand. Neither, the lead nor the zinc in thickener overflow 74 meets the permitted discharge limits. Thus, in the preferred embodiment, a downflow filter 80 with two cells, each containing forty square feet of filter area, is used to remove contaminants before discharge. The resulting filtrate 84 may then be discharged, meeting the NPDES discharge criteria. Sand filter 80 needs to be backwashed in order to maintain its functionality. Thus, backwash 90, which contains suspended solids filtered by sand filter 80, is directed to backwash holding tank 92. Backwash 90 contained in backwash holding tank 92 is directed by pump 94 back to the neutralization reactor 20 for further treatment. The two cells of downflow filter 80 allow a continual filtration process. When one cell is down for backwash, the other cell will still be operating to produce an acceptable filtrate quality.

EXAMPLE

Vacuum degasser slurry was directed to a Lamella plate settler. The underflow from the plate settler was discharged at a rate of 75 pgm. The underflow was directed to a thickener with an average detention time of 8 hours. After this period, 44 lbs of $Ca(OH)_2$/1000 gallons of VDG slurry and 175 pounds of powdered limestone/1,000 gallons of VDG slurry were added to the settled underflow. The mixture was allowed to stand for 17 hours. The cloudy supernatant was decanted off, leaving a slurry containing 13 percent solids. That slurry was filtered to produce a cake containing 61.1% solids. The cake was friable and completely solid throughout, with no wet spots. A TCLP test was run on the cake and the lead concentration in the leachate was less than 5.0 ppm, ten times lower than the 5.0 ppm limit. The supernatant and filtrate had to be redirected to the neutralization reactor for further treatment prior to discharge.

While this invention has been described as having a preferred design, it is understood that it is capable of further modifications, uses, and/or adaptations of the invention and including such departures from the present disclosure as come within known or customary practice in the art to which the invention pertains, as may be applied to the central features here and before set forth, and fall within the scope of the invention and be limited to appended claims.

We claim:

1. A method for disposing of contaminants in a vacuum degasser water circuit, comprising the steps of:
   a) adjusting the pH of an underflow stream containing lead and zinc in the water circuit to a level sufficient to precipitate solids including lead and zinc;
   b) concentrating suspended solids in the underflow stream;
   c) communicating the concentrated solids of the underflow stream to a holding vessel;
   d) adding lime to the underflow stream in the holding vessel and allowing the underflow stream to settle;
   e) removing supernatant from the underflow stream in the holding vessel;
   f) adding limestone to the underflow stream in the holding vessel; and
   g) dewatering the underflow stream from the holding vessel.

2. The process of claim 1, including the step of:
   a) concentrating the suspended solids of the underflow stream in a thickener.

3. The process of claim 2, including the step of:
   a) discharging the overflow of the thickener.

4. The process of claim 3, including the step of:
   a) filtering the thickener overflow prior to discharge.

5. The process of claim 4, including the step of:
   a) performing said step of filtering the thickener overflow in a sand filter.

6. The process of claim 1, including the step of:
   a) performing said step of dewatering the underflow stream at a maximum pressure of 200 psig.

7. The process of claim 1, including the step of:
   a) dewatering the underflow stream to produce a filter cake and a filtrate.

8. The process of claim 1, including the steps of:
   a) adding between about 48 lbs and 65 lbs of lime per 1,000 gallons of underflow stream in the holding vessel to the underflow stream in the holding vessel; and
   b) allowing the underflow stream to settle for at least six hours.

9. The process of claim 8, including the step of:
   a) adding between about 15 lbs and 43 lbs of limestone per 1,000 gallons of underflow stream in the holding vessel after the underflow stream in the holding vessel has settled.

10. The process of claim 1, including the step of:
    a) adjusting the pH of the underflow stream by adding sulfuric acid in an amount sufficient to maintain the pH of the underflow stream of between about 8.0 and 9.0.

11. The process of claim 10, including the step of:
    a) adding at least 3.0 ml of concentrated sulfuric acid to each gallon of underflow stream, when supernatant and/or filter press filtrate are part of the wastewater stream.

12. The process of claim 1, including the step of:
    a) allowing the underflow stream in the thickener to settle for at least three hours.

13. A method for disposing of contaminants in a vacuum degasser water circuit, comprising the steps of:
    a) adjusting the pH of an underflow stream containing lead and zinc in the water circuit in a reaction vessel to a level sufficient to precipitate solids including lead and zinc;
    b) communicating the underflow stream of the reactor vessel to a thickener to concentrate suspended solids in the underflow stream and produce an overflow;
    c) communicating the underflow stream of the thickener vessel to a holding vessel;
    d) adding lime to the underflow stream in the holding vessel and allowing the underflow stream to settle;
    e) removing supernatant from the underflow stream and communicating the supernatant to the reactor vessel;
    f) adding limestone to the underflow stream in the holding vessel;
    g) dewatering the underflow stream from the holding vessel to produce a filter cake and filtrate; and
    h) communicating the filtrate to the reactor vessel for further treatment.

14. The previous claim 13, including the step of:
    a) filtering the thickener overflow prior to discharge.

15. The process of claim 14, including the step of:
    a) filtering the thickener overflow in a sand filter.

16. The process of claim 13, including the step of:
    a) preforming said step of dewatering the underflow stream at a maximum pressure of 200 psig.

17. The process of claim 13, including the steps of:
    a) adding between about 48 lbs and 65 lbs of lime per 1,000 gallon of underflow stream in the holding vessel to the underflow stream in the holding vessel; and
    b) allowing the underflow stream to settle for at least six hours.

18. The process of claim 17, including the step of:
    a) adding between about 15 lbs and 43 lbs of limestone per 1,000 gallons underflow stream in the holding vessel to the underflow stream in the holding vessel after the underflow stream has settled.

19. The process of claim 13, including the step of:
    a) adjusting the pH of the underflow stream by adding sulfuric acid to the reactor vessel in a amount sufficient to maintain the pH of the underflow stream of between about 8.0 and 9.0.

20. The process of claim 19, including the step of:
    a) adding at least 3.0 ml of concentrated sulfuric acid to each gallon of underflow stream, when supernatant and/or filter press filtrate are part of the wastewater stream.

21. The process of claim 13, including the step of:
    a) allowing the underflow stream in the thickener to settle for at least three hours.

22. A method for disposing of contaminates in a vacuum degasser water circuit, comprising the steps of:
    a) adjusting the pH of an underflow stream containing lead and zinc in the water circuit to a level sufficient to precipitate solids including lead and zinc;

b) concentrating suspended solids in the underflow stream;

c) communicating the concentrated solids of the underflow stream to a holding vessel;

d) adding lime and limestone to the underflow stream in the holding vessel and allowing the underflow stream to settle;

e) removing supernatant from the underflow stream in the holding vessel; and f) dewatering the underflow stream from the holding vessel.

23. A method for disposing of contaminants in a steel facility wastewater circuit, comprising the steps of:

a) adjusting the pH of an underflow stream containing lead and zinc in the wastewater circuit to a level sufficient to precipitate solids including lead and zinc;

b) concentrating suspended solids in the underflow stream;

c) communicating the concentrated solids of the underflow stream to a holding vessel;

d) adding lime to the underflow stream in the holding vessel and allowing the underflow stream to settle;

e) removing supernatant from the underflow stream in the holding vessel;

f) adding limestone to the underflow stream in the holding vessel; and g) dewatering the underflow stream from the holding vessel.

24. A method for disposing of contaminants in a steel facility wastewater circuit, comprising the steps of:

a) adjusting the pH of an underflow stream containing lead and zinc in the wastewater circuit in a reaction vessel to a level sufficient to precipitate solids including lead and zinc;

b) communicating the underflow stream of the reactor vessel to a thickener to concentrate suspended solids in the underflow stream;

c) communicating the underflow stream of the thickener vessel to a holding vessel;

d) adding lime to the underflow stream in the holding vessel and allowing the underflow stream to settle;

e) removing supernatant from the underflow stream and communicating the supernatant to the reactor vessel;

f) adding limestone to the underflow stream in the holding vessel;

g) dewatering the underflow stream from the holding vessel to produce a filter cake and filtrate; and h) communicating the filtrate to the reactor vessel for further treatment.

25. A method for disposing of contaminants in a steel facility wastewater circuit, comprising the steps of a) adjusting the pH of an underflow stream containing lead and zinc in the wastewater circuit to a level sufficient to precipitate solids including lead and zinc;

b) concentrating suspended solids in the underflow stream;

c) communicating the concentrated solids of the underflow stream to a holding vessel;

d) adding lime and limestone to the underflow stream in the holding vessel and allowing the underflow stream to settle;

e) removing supernatant from the underflow stream in the holding vessel; and f) dewatering the underflow stream from the holding vessel.

* * * * *